(12) United States Patent
Braithwaite et al.

(10) Patent No.: US 8,691,308 B2
(45) Date of Patent: Apr. 8, 2014

(54) METHOD AND SYSTEM FOR TREATING FOOD ITEMS WITH AN ADDITIVE AND SOLID CARBON DIOXIDE

(75) Inventors: David C. Braithwaite, Katy, TX (US); Meenakshi Sundaram, Newark, DE (US); Vasuhi Rasanayagam, Bear, DE (US)

(73) Assignees: American Air Liquide, Inc., Fremont, CA (US); Air Liquide Industrial U.S. LP, Houston, TX (US)

( * ) Notice: Subject to any disclaimer, the term of this patent is extended or adjusted under 35 U.S.C. 154(b) by 1037 days.

(21) Appl. No.: 12/470,467

(22) Filed: May 21, 2009

(65) Prior Publication Data
US 2010/0293969 A1  Nov. 25, 2010

(51) Int. Cl.
*A22C 5/00* (2006.01)

(52) U.S. Cl.
USPC ........... 426/327; 426/281; 426/302; 426/274; 426/332

(58) Field of Classification Search
USPC ......... 426/235, 335, 477, 316, 392, 574, 504, 426/506, 515, 524, 274, 281, 302, 641, 513, 426/327, 332; 62/1, 78, 602, 604, 68
See application file for complete search history.

(56) References Cited

U.S. PATENT DOCUMENTS

| | | | | |
|---|---|---|---|---|
| 3,214,928 A * | 11/1965 | Oberdorfer | ...................... | 62/63 |
| 3,492,829 A * | 2/1970 | Stanford, Jr. | ..................... | 62/603 |
| 3,815,377 A * | 6/1974 | Tyree, Jr. | .......................... | 62/62 |
| 4,200,656 A | 4/1980 | Cohen et al. | | |
| 4,314,451 A * | 2/1982 | Leeds et al. | ........................ | 62/68 |
| 4,750,331 A | 6/1988 | Barthelmes et al. | | |
| 5,218,826 A * | 6/1993 | Kirschner et al. | ............. | 62/48.1 |
| 5,744,182 A * | 4/1998 | Andersson et al. | ........... | 426/316 |
| 5,928,573 A * | 7/1999 | Spencer et al. | ............ | 261/122.1 |
| 6,047,496 A | 4/2000 | Leitner et al. | | |
| 7,781,006 B2 * | 8/2010 | Brisson et al. | ................ | 426/565 |
| 8,470,383 B2 * | 6/2013 | Rasanayagam et al. | ....... | 426/327 |
| 2003/0041602 A1 * | 3/2003 | Williams et al. | ................... | 62/64 |
| 2005/0100646 A1 | 5/2005 | Giacobbe et al. | | |
| 2005/0260311 A1 * | 11/2005 | Garwood | ....................... | 426/480 |
| 2007/0059201 A1 | 3/2007 | Sundaram et al. | | |
| 2007/0059415 A1 * | 3/2007 | Sundaram et al. | ............ | 426/335 |
| 2007/0261436 A1 | 11/2007 | Sundaram et al. | | |

FOREIGN PATENT DOCUMENTS

| | | |
|---|---|---|
| GB | 1 536 170 | 12/1978 |
| JP | 60 075267 | 4/1985 |
| WO | WO 2006/129153 | 12/2006 |

OTHER PUBLICATIONS

"Fungicide for dry ice for food storage—contains stabilised chlorine dioxide," DERWENT, Apr. 27, 1985, XP002262039, Abstract.
International Search Report and Written Opinion for PCT/US2010/03521, mailed Dec. 21, 2010.

* cited by examiner

*Primary Examiner* — Steven Leff
(74) *Attorney, Agent, or Firm* — Christopher J. Cronin

(57) ABSTRACT

Embodiments of the invention generally provide methods and systems that distribute an additive in solid carbon dioxide in an interior of food processing equipment. The additive may be injected into a flow of liquid carbon dioxide upstream of an expander at or adjacent to the interior. Injection of the additive into the interior may be alternated with directing a flow of expanded carbon dioxide into the interior. In some embodiments, the freezing point of the additive with or without a diluent composition and/or additive(s) is lower than a temperature of the liquid carbon dioxide.

11 Claims, 2 Drawing Sheets

METHOD AND SYSTEM FOR TREATING FOOD ITEMS WITH AN ADDITIVE AND SOLID CARBON DIOXIDE

CROSS-REFERENCE TO RELATED APPLICATIONS

None.

BACKGROUND

1. Field of the Invention

The invention relates to the improvement of sanitization techniques used during the processing of food products, more specifically to the use of an additive and carbon dioxide ($CO_2$) to treat food items in an interior of food processing equipment.

2. Description of the Related Art

It's typical for food companies to add additives during processing steps in order to improve the safety, quality and texture of food products. The list of additives for a specific use and approved limits may be any one that is listed as GRAS (Generally Recognized as Safe) by the United States Food & Drug Administration. The additives are classified based on their intended use in food (or) type of chemical compound such as antimicrobial, preservative, colorant, flavor, antioxidants, reducing agents, antifungal agents, antibiotics, oxidative and reducing agents, pH agents, etc. For example, preservatives are static agents that are added to food to inhibit microbial growth and must be non-toxic and safe for human consumption. Salts of organic acids (propionate, sorbate, benzoate and lactate) are preservatives that act by increasing the proton concentration of the cytoplasm of many microbes. In general, antimicrobials and preservatives penetrate the cell membranes and disrupt ATP synthesis in respiring microorganisms. These effects in cellular membrane cause slow growth and negatively impact cell energy. Likewise, each additive have a specific use for addition to food products.

Food safety problems not only originate in the food product itself (e.g., raw ingredients), but also from the environment surrounding the food product. A food product is susceptible to microbial contamination during the processing steps and after the terminal heating process. Operations with poor sanitation in the packing environment can significantly increase the risk of contaminating a food product. For example, pathogenic microorganisms may be found on the floors and in the drains in the packing facility and on the surfaces of sorting, grading, and packing equipment. Without good sanitary practices, any of these surfaces that come in contact a food product could be a potential source of microbial contamination.

According to at least one estimate, post/cross contamination from either environment or food contact surfaces is implicated in up to 30% of food poisoning cases. Post/cross contamination also increases the microbial load in finished products, shortening shelf-life and becoming a visual deterrent of quality. As such, the finished product can serve as a carrier of cross-contamination leading to economic losses, as well as health and survival issues involving consumers. For example, *Listeria* spp is an environmental air-borne pathogen causing listeriosis that can contaminate food products during processing. According to the Center for Disease Control, there were 1850 cases of listeriosis in 1998, including 435 deaths from this disease. Effective methods using sanitizers/disinfectants are crucial to minimize and prevent microbial contamination of foods.

Effective sanitation of food or other items depends on the combination of what is to be sanitized and the sanitation process type. Not all of the currently available technologies can deliver an effective reduction of microorganisms and at the same time prevent product or environmental degradation. It is well known in the art to cool products, such as foods, during processing with some type of refrigerant to slow down the growth of unwanted microbes and enzymatic reactions in foods. For instance, the shelf life and quality of food products are improved by processing, transporting, and storing under refrigerated conditions.

Cooling agents, such as dry ice, are solid agents that can be used as expendable refrigerants. Water ice is a traditional expendable refrigerant, but has the disadvantage of converting to water after the ice melts. Solid $CO_2$, or dry ice, sublimes by going directly from a solid to a gas without passing through the liquid stage. The cold temperature of dry ice and the fact that it leaves no residue like water ice makes it an excellent refrigerant in some applications. For example, when transporting food products that must remain frozen, the food can be packed with dry ice. However, since dry ice is a solid, it cannot readily be injected into equipment typically used in the processing of food products.

There are many applications that use solid $CO_2$ as the coolant to chill and freeze food products (beef, poultry, seafood, etc.) during processing steps. Liquid $CO_2$ can be injected into various types of equipment involved in food processing such as tumblers, mixers, freezing tunnels, and blenders to effectively refrigerate the equipment for extended periods of time.

Although refrigeration can retard microbial growth, such treatment does not necessarily kill bacteria. Accordingly, microorganisms can still survive through refrigeration, and worse, some microorganisms can still grow and produce harmful substances during refrigerated storage. It is desirable to sanitize equipment and processed foods with a combination of cooling properties found in cooling agents and antimicrobial capabilities of sanitizing agents. It is further desirable to expose the equipment or food product to a cooling agent and sanitizing agent simultaneously.

Therefore, there remains a need to provide an improved method for treating and cooling food items.

SUMMARY

There is provided a method of treating a food item that includes the following. A flow of liquid carbon dioxide is provided to an interior of food processing equipment. The liquid carbon dioxide is expanded at or adjacent to the interior to form a flow of gaseous and solid carbon dioxide thereat. The flow of gaseous and solid carbon dioxide is directed into the interior to come into contact with food items therein. A flow of an additive is injected into the interior before, during or after directing the flow of gaseous an solid carbon dioxide into the interior.

There is also disclosed a system for treating a food item that includes: a tank containing liquid carbon dioxide; a container containing an additive; a first conduit having first and second ends, the first end being in fluid communication with the liquid carbon dioxide in the tank; an expansion device fluidly communicating with the first conduit second end and being adapted to expand a flow of liquid carbon dioxide thereat to produce a flow of gaseous and solid carbon dioxide; food processing equipment having an inlet adapted to receive the flow of gaseous and solid carbon dioxide into an interior there; and a metering unit adapted to meter out a controlled amount of the additive for introduction into the interior via the first conduit.

The disclosed method and/or system may include one or more of the following aspects:

the method further includes the following steps:
  additive is injected into the flow of liquid carbon dioxide;
  the liquid carbon dioxide and additive are mixed in a conduit; and
  the mixed additive and liquid carbon dioxide are expanded at or adjacent the interior to cause the additive and the gaseous and solid carbon dioxide to contact the food items.

the method further includes the following steps:
  the expansion is performed with a snow horn adjacent the interior; and
  a flow of the expanded additive and carbon dioxide are directed from the snow horn into the interior to contact the food items.

the mixed additive and liquid carbon dioxide are expanded at a nozzle fluidly communicating with the interior.

the step of injecting the additive is repeatedly alternated with the step of directing the flow of gaseous and solidified carbon dioxide.

the method further includes the following steps:
  a tank of liquid carbon dioxide is provided having a headspace of gaseous carbon dioxide;
  a container of the additive is provided;
  a first conduit fluidly communicating with the container is provided;
  a second conduit fluidly communicating with the liquid carbon dioxide in the tank is provided, the first conduit, and the interior of the food processing equipment;
  a pressure in an interior of the container is caused to be higher than a pressure of the flow of liquid carbon dioxide; and
  the liquid carbon dioxide is alternatingly allowed to flow through the second conduit to the food processing equipment interior and allowing the additive to flow through the first and second conduits to the food processing equipment interior.

the step of causing a pressure includes the following steps:
  the container interior is pressurized with the gaseous carbon dioxide in the tank headspace;
  a liquid carbon dioxide regulator in fluid communication between the tank and the second conduit is provided; and
  a pressure of the liquid carbon dioxide flowing into the second conduit is reduced with the regulator such that the flow of liquid carbon dioxide has a pressure lower than that of the tank.

the step of causing a pressure comprises pressurizing the container interior with an external source of gaseous carbon dioxide to a pressure higher than that of the tank headspace.

the method further includes the following steps:
  a tank containing the liquid carbon dioxide is provided, the tank having a headspace of gaseous carbon dioxide;
  a container containing the additive is provided;
  a pump in fluid communication with the container is provided;
  a first conduit fluidly communicating with the liquid carbon dioxide in the tank, the pump, and the the interior is provided; and
  a second conduit fluidly communicating between the tank headspace and the first conduit is provided;
  wherein the alternate injection is performed by:
    the flow of liquid carbon dioxide from the tank to the interior via the first conduit is allowed;
    a flow of gaseous carbon dioxide is allowed from the headspace through the second conduit and into the first conduit to flush liquid carbon dioxide from the first conduit; and
    an amount of the additive is pumped into the first conduit with the pump while simultaneously allowing a flow of gaseous carbon dioxide from the headspace to the interior via the first conduit such that the additive is injected into the interior.

the additive is diluted in a diluent composition and the diluted additive/diluent composition has a freezing point lower than a temperature of the liquid carbon dioxide.

the diluent composition comprises a non-aqueous solvent.

the diluent composition further comprises water.

the food processing equipment is selected from the group consisting of: bottom injection mixers; top injection mixers; $CO_2$ refrigerated cabinet freezers; $CO_2$ refrigerated tunnels; $CO_2$ refrigerated spiral tunnels; blenders; marinators; meat choppers; vegetable choppers; auger screws; food transport containers; batch tumblers; and continuous tumblers.

the food processing equipment is a bottom or top injection mixer and said method further comprises the step of mixing the food product in the food processing equipment interior with the solid carbon dioxide and the additive.

the food item is meat.

the method further includes the following steps:
  a tank containing the liquid carbon dioxide is provided;
  a container of the additive is provided; and
  a liquid pump is provided, wherein the additive is injected into the flow of liquid carbon dioxide with the pump.

the additive is not dissolved in a solvent and has a freezing point lower than a temperature of the liquid carbon dioxide the metering unit comprises a liquid pump having an inlet in fluid communication with the additive in the container and an outlet in fluid communication with the first conduit.

the metering unit comprises means for pressurizing an interior of the container, the means for pressurizing adapted to pressurize the container interior to a pressure higher than that of the liquid carbon dioxide.

the means for pressurizing comprises:
  a second conduit in fluid communication between a headspace of the tank and a headspace of the container such that the headspaces are pressure equalized; and
  a liquid carbon dioxide regulator in fluid communication between the tank and the first conduit first end adapted to reduce a pressure of the liquid carbon dioxide as the liquid carbon dioxide flows from the tank and into the first conduit first end.

the means for pressurizing comprises an external source of high pressure gas in fluid communication with a headspace of the container.

the food processing equipment further comprises an expansion nozzle fluidly communicating with the inlet adapted to expand a flow of liquid carbon dioxide to ambient pressure.

the expansion nozzle is made of or coated with a nonstick or heat insulative material.

the expansion nozzle comprises a body made of a heat conducting material and an insert disposed within the body that is made of or coated with a nonstick or heat insulative material.

the first conduit has a plurality of bends formed therein adapted to increase mixing of the additive when it is injected into a flow of the liquid carbon dioxide therein.

the additive is diluted in a diluent composition and the diluted additive/diluent composition has a freezing point lower than a temperature of the liquid carbon dioxide.

the diluent composition comprises a non-aqueous solvent, the diluent composition having a freezing point lower than 0° F.

the diluent composition further comprises water.

the food processing equipment is selected from the group consisting of: bottom injection mixers; top injection mixers; $CO_2$ refrigerated cabinet freezers; $CO_2$ refrigerated tunnels; $CO_2$ refrigerated spiral tunnels; blenders; marinators; meat choppers; vegetable choppers; auger screws; food transport containers; batch tumblers; and continuous tumblers.

the food processing equipment is a bottom or top injection mixer.

the additive is not dissolved in a solvent and has a freezing point lower than 0° F.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
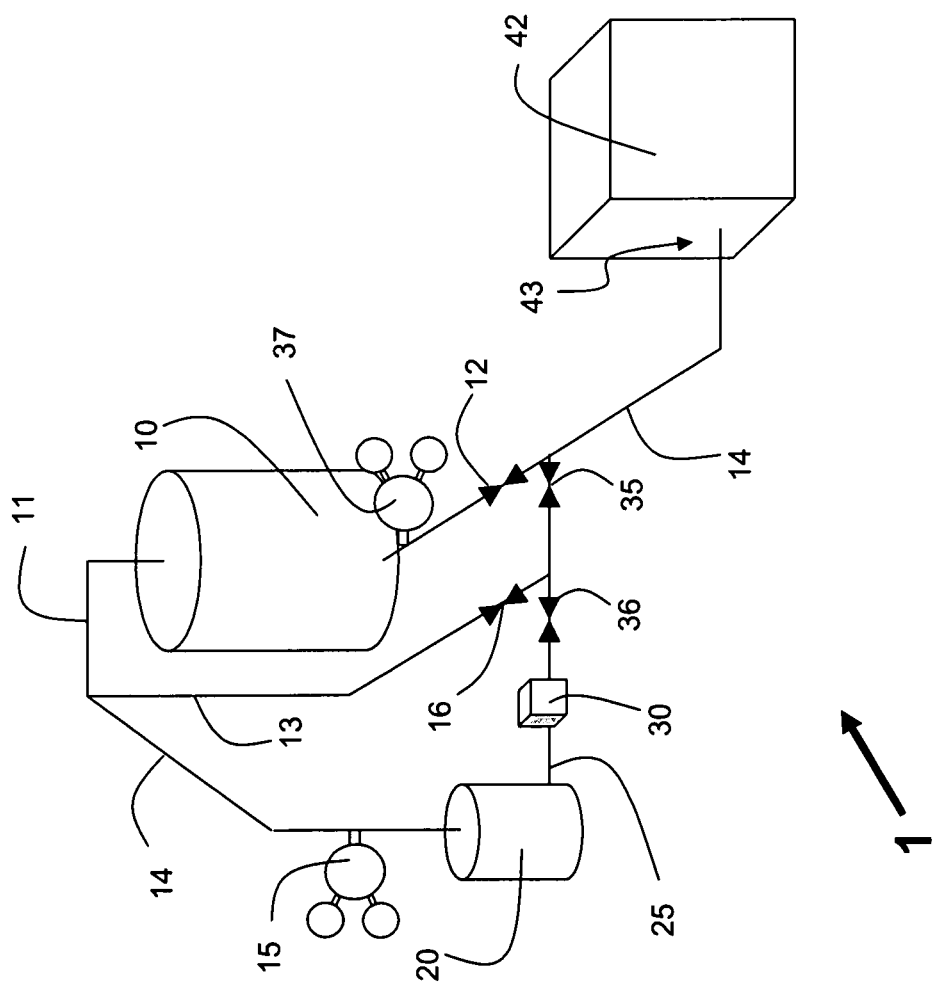
FIG. 1 illustrates an apparatus 1 used to inject an additive and liquid carbon dioxide into food processing equipment.

The words and phrases used herein should be given their ordinary and customary meaning in the art by one skilled in the art unless otherwise further defined.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the invention generally provide methods and systems of injecting an additive into a stream of liquid carbon dioxide and expansion of the additive/liquid carbon dioxide at or adjacent to the interior of food processing equipment for providing food items contained therein with both an antimicrobial and a cooling treatment. Other embodiments of the invention generally provide methods and systems of alternating injection of the additive into the interior of the food processing equipment and expansion of the liquid carbon dioxide at or adjacent to the interior.

The additive may be any substance suitable for addition to food items or suitable for treating food items. When the food item to be treated is for human consumption, the additive should be one that is considered safe in the country or jurisdiction within which the invention is performed. For example, in the United States, the additive may be any one that is listed as GRAS (Generally Recognized as Safe) by the United States Food & Drug Administration. One of ordinary skill in the art will recognize that new additives may be approved by the food regulatory agency in the country or jurisdiction where the inventions is performed and that the invention may be practiced with such new additive. A non-limiting list of additives includes antimicrobials, flavoring agents, flavor enhancers, intensifiers, emulsifiers, binders, fillers, gelling agents, plasticizers, stabilizers, suspending agents, whipping agents, sweetening agents, colors, enzymes, antioxidants, sequestrants, wetting agents, surfactants, curing and pickling agents, firming agents, fumigants, humectants, leavening agents, processing aids, surface active agents, surface finishing agents, synergists, texturizers, and mixtures thereof. If no diluent composition is used, then preferably the additive will have a freezing point lower than the temperature of the liquid $CO_2$.

Preferably, the additive is an antimicrobial compound. Antimicrobial agents are often used to sanitize equipment, provide aseptic environments, and sanitize foods while reducing spoilage of the food product. The reaction of antimicrobial agents with microbial cell structures is often irreversible; therefore, the cells either become attenuated or die. As used in this invention, the term "antimicrobial" means a physical or chemical agent capable of inhibiting or retarding the growth of bacteria to a measurable degree (such as through increased shelf-life) or a physical or chemical agent capable of causing a reduction in the population of bacteria or spores to a measurable degree. Any antimicrobial compound meeting the above definition for "antimicrobial" may be used in practice of the invention. When the food item to be treated is for human consumption, the antimicrobial compound should be one that is considered safe in the country or jurisdiction within which the invention is performed. For example, in the United States, the antimicrobial compound may be any one that is listed as GRAS by the United States Food & Drug Administration. One of ordinary skill in the art will recognize that new antimicrobial compounds may be approved by the food regulatory agency in the country or jurisdiction where the inventions is performed and that the invention may be practiced with such new antimicrobial compound.

In the case of water-soluble additives, the diluent composition will of course include water. Typical examples of water-soluble antimicrobial compounds include potassium nitrite, potassium nitrate, natural lactic acid, lactates, gluconates, lacititol, parabens (derivatives of phenol), and salts of organic acids (such as propionates, sorbates, benzoates and lactates) that are recognized as preservatives. Preferred antimicrobial compounds include potassium gluconate, ammonium lactate, potassium lactate, sodium lactate, sodium lactate powder, and sodium diacetate. Other preferred types of antimicrobial compound useful for practice with invention include parabens, a group of chemicals which are derivatives of phenol.

Parabens are widely used as preservatives in the cosmetic and pharmaceutical industries, and are also popular in the meat processing industry. Preferably, the paraben is methyl paraben, sold by The KIC Group (Vancouver, Wash.). When a water-soluble antimicrobial compound is used, the diluent composition may also contain a non-aqueous solvent. In this latter case, the non-aqueous solvent is miscible with water and serves to depress the overall freezing point of the diluent composition to a desired level, such as no greater than $-10°$ F.

A food product is susceptible to microbial contamination during virtually all steps of preparation. While refrigeration can retard microbial growth, such treatment does not necessarily kill bacteria. Additionally, the retarding effect is of course greatly reduced once the chilling is discontinued. Accordingly, microorganisms can still survive through refrigeration, and worse, some microorganisms can still grow and produce harmful substances during refrigerated storage. It is desirable to treat food processing equipment and foods using a combination of the cooling properties of solid carbon dioxide with the microbial growth-inhibiting or killing capability of an additive comprising an antimicrobial compound.

The disclosed method and system may be used with any food product that may be advantageously chilled with solid $CO_2$. Preferably, the food product is any of meat (including beef, pork, and chicken), dairy products, eggs, and formed food products.

The additive may be a liquid or a solid. It may be dissolved in a diluent composition comprising water and/or a non-aqueous solvent. A diluent composition including both water and a non-aqueous solvent (especially a non-polar one) is desirable for additives soluble in water where the non-aqueous solvent serves to depress the freezing point of the diluent composition. Alternatively, the additive may be added to the food product with the $CO_2$ without any diluent composition. In that case, it is preferably to use an additive that has a freezing point lower than the temperature of the liquid $CO_2$ to avoid any tendency for the additive to freeze.

A non-aqueous diluent composition should have a relatively low freezing point (not greater than a temperature of the liquid $CO_2$). Preferably, such a diluent composition has a freezing point that is lower than the temperature of the liquid $CO_2$. When the food item to be treated is for human consumption, the non-aqueous diluent composition may include any non-aqueous solvent that the antimicrobial compound may be dissolved in and which is considered safe in the country or jurisdiction within which the invention is performed. For example, in the United States, the non-aqueous solvent may be any one that is listed as GRAS by the United States Food & Drug Administration. One of ordinary skill in the art will recognize that new substances (that are non-aqueous and have additive-solvating properties) may be approved by the food regulatory agency in the country or jurisdiction where the inventions is performed and that the invention may be practiced with such new carrier chemicals. Typical examples of a non-aqueous solvent include alcohols, terpenes, or polyethylene glycol. An alcohol is any organic compound in which a hydroxyl group (—OH) is bound to a carbon atom of an alkyl or substituted alkyl group. The general formula for a simple acyclic alcohol is $C_nH_{2n+1}OH$. Food grade ethanol has the advantage of having a relatively low freezing point. Terpenes are another large group of chemicals compounds found in nature that act as effective solvents with low freezing points. One such example is D-limonene, present in orange peel and extracted from the orange skin. Finally, ethylene glycol is a non-toxic liquid with low molecular weight, and is a common ingredient of antimicrobial pharmaceuticals.

In an especially preferred embodiment, the additive is an antimicrobial compound and is the active ingredient found in the food additive MIRENAT-N, manufactured by Vedeqsa Lamirsa Group based in Barcelona, Spain and distributed in the U.S. by A & B Ingredients (Fairfield, N.J.). MIRENAT-N is manufactured from a naturally occurring antimicrobial compound, and its active ingredient is lauric arginate (N-lauroyl-L-Arginine ethyl ester monohydrochloride). The formulation available for sale contains about 10% active lauric arginate and 90% food grade propylene glycol. It is possible to substitute ethanol for propylene glycol as the non-aqueous solvent when using MIRENAT-N. Advantages of using MIRENAT-N may include: minimal modification of original product, low application use dosage, and well known antimicrobial activity. Based on the manufacturer's specifications, MIRENAT-N can be manufactured to be lower than 11% active in ethanol. MIRENAT, either in propylene glycol, or ethanol, when treated with meat or poultry, can lose its efficacy over time, due to enzymatic reactions. Such problems can be overcome by adding other preservatives or antimicrobials to MIRENAT-N.

The additive is generally added to the food processing equipment with a metering unit that meters out a controlled amount of the additive. Typically, the metering unit is a liquid pump or a source of high pressure gas. The high pressure gas may be $CO_2$ from a headspace of a tank containing the liquid $CO_2$ or an external source of a relatively inert gas, including $CO_2$, $N_2$, and air.

As best illustrated in FIG. 1, a system 1 is used to treat a food item according to an embodiment of the invention. Liquid $CO_2$ is contained within a liquid $CO_2$ tank 10, typically at a pressure of about 285 to 305 psig and at a temperature of about $-5$ to $10°$ F. More typically, it is maintained at a pressure and temperature of about 300 psig and $0°$ F., respectively. Upon opening of valve 12, a stream of liquid $CO_2$ from tank 10 flows through conduit 14. At the same time, upon opening of valve 35 (and optional valve 36), an amount of the additive with or without the diluent composition is pumped from container 20 through conduit 25 and open valve 36 by pump 30 and into conduit 14 where it mixes with the liquid $CO_2$ as a result of turbulent flow. The mixing may be enhanced by introducing one or more $90°$ bends in conduit 14. If the conduit 14 has any low points in between the point at which the additive is injected into the stream of liquid $CO_2$, the additive may tend to pool in the conduit 14. It is believed that the stream of liquid $CO_2$ will tend to flow over the surface of any pooled additive. In order to alleviate this condition, conduit 14 preferably extends downwardly from the tank 10 towards food processing equipment 42 with no or few low points in between. Finally, The effectiveness of the pump 30 may optionally be enhanced by pressurizing a headspace of the container 20 with gaseous $CO_2$ from a headspace of the tank 10 via conduit 14. The pressure of the gaseous $CO_2$ may be adjusted with regulator 15.

If the additive or a mixture of the additive, diluent composition (if selected), and additive(s) (if selected) has a freezing point higher than the temperature of the liquid $CO_2$ one of ordinary skill in the art will recognize that the relatively low temperature of the liquid $CO_2$ flowing through conduit 14 will, to some degree, cool valve 35, conduit 32, and/or pump 30 such that the additive with or without the diluent composition and/or additive(s) may have the tendency to freeze. Additionally, it may freeze inside conduit 14 upon addition to the flowing stream of liquid $CO_2$ therein, thereby creating a risk that conduit 14 may plug up. Thus, it is preferable to utilize an additive or a mixture of an additive with or without diluent composition and/or additive(s) that has a freezing point higher than the temperature of the liquid CO2. Notwithstanding the above, if it is desired to utilize one having a freezing point higher than the temperature of the liquid $CO_2$, the pump 30, conduit 32 and/or valve 35 may be heated with any conventional technique, such as wrapping them with heat tape, encasing the parts in a metal block through which heating elements extend, or providing a hot water jacket around the parts. Additionally, the amount of additive with or without diluent composition and/or additive(s) added to the flowing stream of liquid $CO_2$ in conduit 14 may be reduced to an extent that, even if freezing inside conduit 14 occurs, the relatively small amount of ice formed will not impede the flow of liquid $CO_2$ therethrough. If the optional heating technique is chosen, for safety reasons, the pressure inside conduit 14 should be carefully monitored in order to avoid over pressurization and a possible uncontrolled release of $CO_2$.

The mixture of additive (or combination of additive with diluent composition and/or additive(s)) and liquid carbon dioxide flows through conduit 14 to an inlet 43 formed in the food processing equipment 42 that communicates with an interior thereof. Due to the pressure difference between the pressure of the mixture of additive (or combination of additive with diluent composition and/or additive(s)) and liquid carbon dioxide in conduit 14 and the ambient pressure within an interior of equipment 42, the mixture is caused to be injected into the interior at inlet 43 and expanded thereat or expanded adjacent the inlet 43. Upon expansion, the liquid $CO_2$ of course turns into a mixture of $CO_2$ vapor and solid $CO_2$. When it is expanded outside the interior (i.e., adjacent to the inlet 43), a stream of mixed gaseous and solid $CO_2$ and additive (or combination of additive with diluent composition and/or additive(s)) is directed into the interior via the inlet 43. For example, a conventional snow horn may be used to direct the stream into a container of food items.

Because the additive is mixed with the liquid $CO_2$ in conduit 14, it becomes well distributed throughout the solid $CO_2$ that is mixed with, or in contact with, the food items.

The disclosed methods and systems may be used with a wide variety of types of food processing equipment adapted to treat food items with solid $CO_2$, including but not limited to: bottom injection mixers; top injection mixers; all types of $CO_2$ refrigerated freezing systems, including cabinets, tunnels and spiral tunnels; mixers; blenders; marinators; meat or vegetable choppers; auger screws; food transport containers (in which case the food item treatment consists of chilling the food item during storage and/or transport) such as a boxed meat container or a bulk meat container; and batch or continuous tumblers. The food processing equipment is made of a food grade metal, preferably stainless steel.

Instead of directly injecting the additive (or combination of additive with diluent composition and/or additive(s)) directly into a stream of liquid carbon dioxide, it and the liquid carbon dioxide may be alternatingly injected into an interior of the food processing equipment 42. No particular time durations for either of the injections are essential for performing the disclosed method. Indeed, one of ordinary skill in the art may vary the durations of each of the injections in a cycle of alternating injection through routine experimentation in order to arrive at optimal parameters.

A first way of achieving alternating injection includes several steps. First, the liquid carbon dioxide flows through conduit 14 and into the interior of the food processing equipment. 42. Second, a controller (not shown) closes valve 12 and optional valve 36. Optional valve 16 is then opened allowing gaseous $CO_2$ from the headspace of tank 10 to flow through optional conduit 13, open valve 35 and into conduit 14 where it purges liquid $CO_2$ into food processing equipment 42 via inlet 43. Third, the controller then opens optional valve 36 and pump 30 injects a small controlled amount of the additive and diluent composition into conduit 25 where the gaseous CO2 serves as a carrier vehicle to push it through conduit 14 and into the interior of the food processing equipment 42 via inlet 43. Optionally, optional valve 36 is closed and the pump 30 is not actuated so that the gaseous $CO_2$ purges the additive and diluent composition from the portion of conduit 25 downstream of the pump 30 as well as the portion of the conduit 14 downstream of conduit 25. Then, valve 35 and optional valve 16 are closed while valve 12 is opened to resume the flow of liquid CO2 through conduit 14 and into the interior of the food processing equipment 43 via inlet 43.

A second way of achieving alternating injection utilizes a means for pressurizing the container 20 instead of pump 30 and does not require optional conduit 13 and optional valves 16, 36. The means for pressurization may be an external source of pressurization gas (such as $CO_2$) to pressurize a headspace of the container 20. In this manner, the container 20 headspace pressure is maintained at a level higher than the pressure of the headspace in the liquid $CO_2$ tank 10. Alternatively, instead of using an external source of pressurization gas, the pressurization gas may be the gaseous $CO_2$ from the headspace of the tank 10 and optional liquid $CO_2$ regulator 37 is used to achieve a pressure reduction of the liquid $CO_2$ entering conduit 14. Regardless of whether one selects an external pressurization gas or the gaseous $CO_2$ from the headspace of the tank 10 is used in conjunction with the liquid $CO_2$ regulator 37, a pressure differential is achieved between the pressure of antimicrobial with or without diluent composition in container 20 and the pressure of the liquid $CO_2$ in conduit 14 adjacent valve 35. The second way of performing alternating injection may be done as follows. First, the liquid $CO_2$ flows from tank 10 to optional regulator 37 where its pressure is reduced. The lower pressure liquid CO2 then flows through conduit 14 and expanded in or adjacent to the interior of the food processing equipment 42. Next, a controller (not shown) or an operator opens valve 35. The higher pressure additive with or without diluent composition flows through conduit 25 and into conduit 14 where it displaces the flow of liquid $CO_2$. When the desired amount of additive is introduced into conduit 14, the controller or operator closes valve 35 thereby allowing the resumption of the flow of liquid $CO_2$ through conduit 14 and expansion in or adjacent to the interior of the food processing equipment 42.

Figure 2:
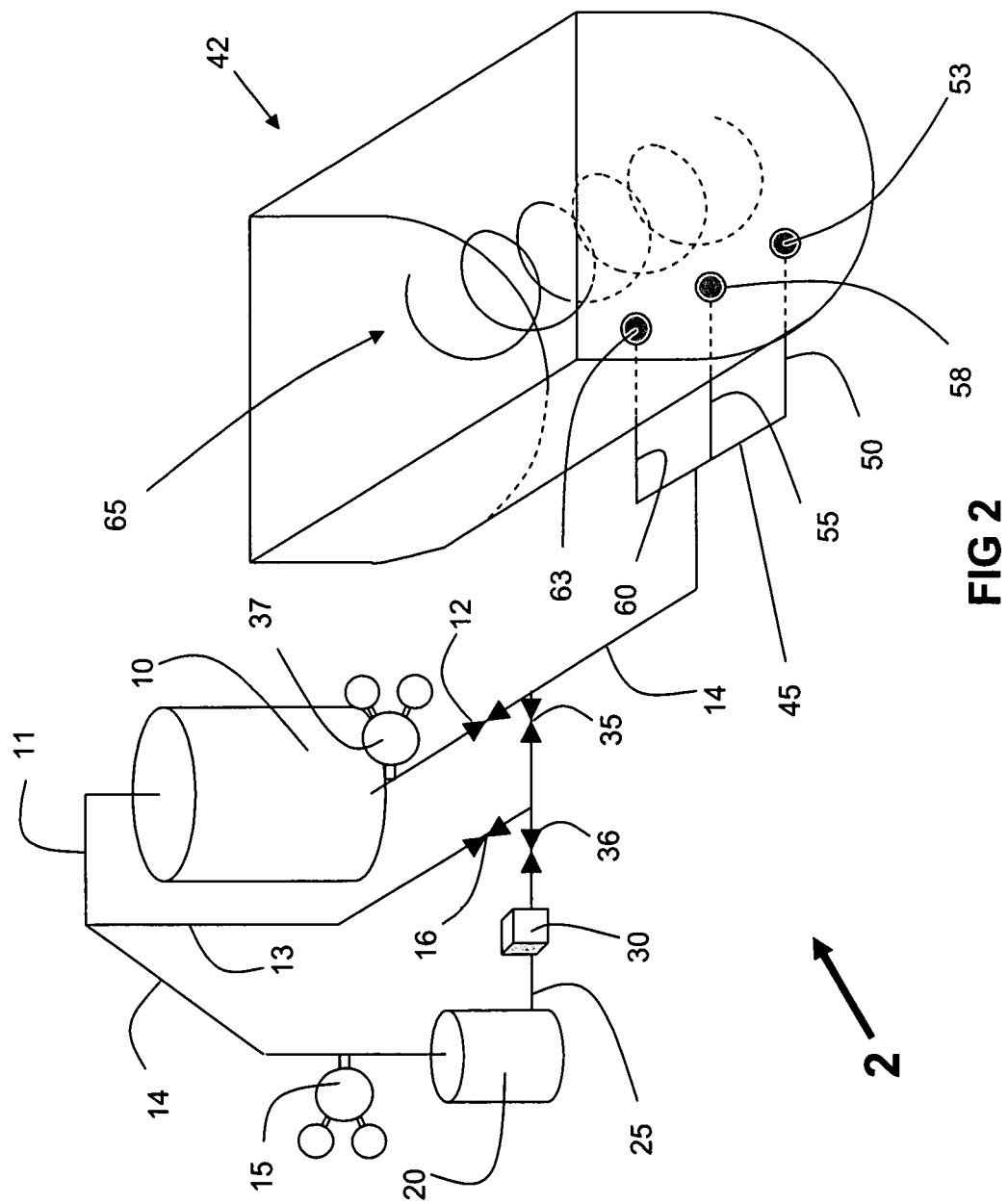
FIG. 2 illustrates an apparatus 2 used to alternately inject an additive and liquid carbon dioxide into a bottom injection mixer.

While the invention may be practiced with a wide variety of food processing equipment, in the embodiment of FIG. 2 the system 2 includes food processing equipment 42 that is a bottom injection mixer. The combined additive, diluent composition, and liquid carbon dioxide flows through conduit 14 to a manifold adjacent the food processing equipment 42. The manifold includes cross-pipe 45 and three legs 50, 55, 60 which communicate with three inlets 53, 58, 63 formed in the bottom of the food processing equipment 42. Due to the pressure difference between the combined additive, diluent composition, and liquid carbon dioxide in conduit 14 and ambient pressure within an interior of equipment 42, the combination is caused to be injected into the interior at inlets 53, 58, 63 and expanded thereat. Upon expansion, the liquid $CO_2$ of course turns into solid $CO_2$. A rotating auger 65 provides intimate mixing of the food item with the solid $CO_2$ and the additive. While a bottom injection mixer is illustrated, one of ordinary skill in the art will recognize that the invention may be practiced with a top injection mixer, in which case, the three legs 50, 55, 60 terminate at nozzles that direct the formulation downwardly towards the food item from a top of the mixer.

Regardless of whether the food processing equipment is the bottom injection mixer of FIG. 2 or another type, expansion of the liquid $CO_2$ will require an expansion nozzle. The structure of such nozzles is well known in the art. Many of such nozzles are constucted of a heat (and cold) conducting material such as stainless steel. Because of its heat (and cold) conducting properties, it will of course become relative cold due to contact with the expanded gaseous and solid $CO_2$. As a result, food items with relatively moist surfaces may tend to freeze against the nozzle surface and stick. Over time, this may clog the nozzle, or in the case of food processing equipment that mixes the food items, impede the mixing. In order to reduce the occurrence or extent of this problem, the nozzle may be made of or coated with a heat insulative material and/or a non-stick material. Alternatively, the nozzle may include an insert (made of or coated with the heat insulative material) forming a barrier between the expanding $CO_2$ and surfaces of the food processing equipment. One of ordinary skill in the art will recognize that non-limiting examples of such a material include those sold under the brand names: Teflon, silicone, UHMW (ultra high molecular weight polyethylene), SilverStone, TFal, Halon, Fluon, and Debron.

Preferably after each batch or run of food items is processed with the solid carbon dioxide and additive, the system 1, 2 may be purged of any residual liquid carbon dioxide or additive (or diluent composition) by flowing high pressure carbon dioxide gas therethrough from the headspace of the tank 10 or any other high pressure gas from an external source (such as Nitrogen or compressed air).

In the case of an antimicrobial compound, the relative amount introduced to the food items inside the food processing equipment will depend upon the effectiveness of the antimicrobial compound and the duration, extent, and uniformity of exposure between the antimicrobial compound and the food items. One of ordinary skill in the art will recognize that the relative amount of antimicrobial compound may be varied through routine experimentation in order to optimize the process according to the desired results. Also, the relative amount of liquid $CO_2$ utilized will depend upon the mass of the food items to be chilled, the temperature drop to be achieved, and the heat capacity of the food items. One of ordinary skill in the art will further recognize that the relative amount of liquid $CO_2$ utilized may also be varied through routine experimentation in order to optimize the process based upon the desired results.

The flow rate of the mixed additive (or combination of additive with diluent composition and/or additive(s)) and liquid $CO_2$ will depend upon how quickly it is desired to add the mixture to the food processing equipment interior. A relatively high flow rate of the mixture may tend to result in a buildup of solidified additive or diluent composition or additive(s) on a surface of the food processing equipment (or in the case of a snow horn on a surface of the snow horn) due to a relatively high flow rate of cold $CO_2$ gas flowing over the surface thereby cooling the surface to a very low level. In order to reduce the extent of this problem, if desired, the flow rate of the mixture may be reduced in order to reduce the flow rate of cold $CO_2$ gas flowing past the surface. Additionally, the number of nozzles or the total nozzle cross-sectional area may be varied. Also, the nozzle may be angled with respect to adjacent surfaces of the food processing equipment so that the expanded $CO_2$ introduced into the food processing equipment does not follow a trajectory that perependicularly strikes the adjacent surfaces, but rather is directed towards the surfaces at an oblique angle.

The disclosed methods and systems provide several advantages. First, by injecting the additive with the liquid carbon dioxide, the capital cost is lowered because a same set of equipment performs two functions. Second, by combining the additive and liquid $CO_2$, we are able to perform two separate process steps (addition of food additives and $CO_2$ refrigeration) into one process step, thereby reducing processing time and minimizing the mixing cycle. Extended mixing cycles can lead to increased heating of the mixture due to friction and mechanical energy, and also lead to mixture degradation through partial emulsification of the product being mixed. Third, by utilizing an additive without a diluent composition, the $CO_2$ serves as the sole diluting agent. Thus, the overall operating cost is reduced and an additional step of mixing the additive with a diluent composition is eliminated. Fourth, by utilizing liquid $CO_2$ and the resulting high pressure stream of $CO_2$ vapor and $CO_2$ solid particles as a carrier vehicle and dispersant for the additive, the amount of mixing energy and time required to create a homogeneous mix can be reduced.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A low-energy and time-efficient method of mixing an additive into meat, said method comprising the steps of:
   providing a tank containing liquid carbon dioxide;
   providing a container of an additive, the additive being a liquid or a solid, wherein:
      the additive is dissolved in a diluent composition comprising water and/or a non-aqueous solvent, or
      the additive is not dissolved in a diluents composition and has a freezing point lower than a temperature of the liquid carbon dioxide;
   providing a liquid pump;
   injecting the additive, with a liquid pump, into a flow of liquid carbon dioxide inside a conduit from the tank to provide a combined flow of liquid carbon dioxide and the additive;
   expanding the combined flow at an inlet formed in a wall of a bottom injection mixer to thereby inject a combined flow of the additive and gaseous and solid carbon dioxide into an interior of the bottom injection mixer; and
   mixing the additive, the solid carbon dioxide and the meat with a rotating auger inside the bottom injection mixer.

2. The method of claim 1, wherein said expansion is performed with a snow horn adjacent the interior; and
   a flow of the expanded additive and carbon dioxide are directed from the snow horn into the interior to contact the food items.

3. The method of claim 1, wherein the additive and liquid carbon dioxide are expanded at a nozzle fluidly communicating with the interior.

4. The method of claim 1, further comprising the step of directing a flow of gaseous and solidified carbon dioxide without the additive to the interior of the food processing equipment, wherein said step of injecting the additive is repeatedly alternated with said step of directing a flow of gaseous and solidified carbon dioxide without the additive to the interior of the food processing equipment.

5. The method of claim 4, further comprising the steps of:
providing a first conduit fluidly communicating with the liquid carbon dioxide in the tank, the pump, and the interior; and
providing a second conduit fluidly communicating between the tank headspace and the first conduit; wherein the alternate injection is performed by:
  allowing the flow of liquid carbon dioxide from the tank to the interior via the first conduit;
  allowing a flow of gaseous carbon dioxide from the headspace through the second conduit and into the first conduit to flush liquid carbon dioxide from the first conduit;
  pumping an amount of the additive into the first conduit with the pump while simultaneously allowing a flow of gaseous carbon dioxide from the headspace to the interior via the first conduit such that the additive is injected into the interior.

6. The method of claim 1, wherein the diluent composition comprises a non-aqueous solvent.

7. The method of claim 6, wherein the diluent composition further comprises water.

8. The method of claim 7, wherein the food processing equipment is a bottom or top injection mixer and said method further comprises the step of mixing the food product in the food processing equipment interior with the solid carbon dioxide and the additive.

9. The method of claim 8, wherein the food item is meat.

10. The method of claim 1, further comprising the steps of:
providing a tank containing the liquid carbon dioxide;
providing a container of the additive; and
providing a liquid pump, wherein the additive is injected into the flow of liquid carbon dioxide with the pump.

11. The method of claim 1, wherein the additive is not dissolved in a solvent and has a freezing point lower than a temperature of the liquid carbon dioxide.

* * * * *